US 9,058,748 B2

(12) United States Patent
Kozakaya

(10) Patent No.: US 9,058,748 B2
(45) Date of Patent: Jun. 16, 2015

(54) CLASSIFYING TRAINING METHOD AND APPARATUS USING TRAINING SAMPLES SELECTED AT RANDOM AND CATEGORIES

(75) Inventor: Tatsuo Kozakaya, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 387 days.

(21) Appl. No.: 13/215,462

(22) Filed: Aug. 23, 2011

(65) Prior Publication Data

US 2012/0052473 A1 Mar. 1, 2012

(30) Foreign Application Priority Data

Aug. 30, 2010 (JP) ................... 2010-192253

(51) Int. Cl.
*G06F 15/18* (2006.01)
*G09B 5/00* (2006.01)
(52) U.S. Cl.
CPC ........................................ *G09B 5/00* (2013.01)
(58) Field of Classification Search
USPC ................. 434/118, 322, 323, 350, 362, 365; 706/12, 45
See application file for complete search history.

(56) References Cited

U.S. PATENT DOCUMENTS

2009/0232403 A1* 9/2009 Waragai et al. ............... 382/209

FOREIGN PATENT DOCUMENTS

| JP | 2001-229379 | 8/2001 |
| JP | 2006-268825 | 10/2006 |
| JP | 2008-284166 | 11/2008 |

OTHER PUBLICATIONS

Japanese Office Action for Japanese Application No. 2010-192253 mailed on Aug. 14, 2012.
Kumar, et al. Attribute and Simile Classifiers for Face Verification, International Conference on Computer Vision, 2009.
Allwein, et al. Reducing Multiclass to Binary: A Unifying Approach for Margin Classifiers, Journal of Machine Learning Research, pp. 113-141, 2000.

* cited by examiner

*Primary Examiner* — David Vincent
(74) *Attorney, Agent, or Firm* — Amin, Turocy & Watson, LLP

(57) ABSTRACT

According to an embodiment, a learning apparatus includes a learning sample storage unit configured to store therein a plurality of learning samples that are classified into a plurality of categories; a selecting unit configured to perform, plural times, a selection process of selecting a plurality of groups each including one or more learning samples from the learning sample storage unit; and a learning unit configured to learn a classification metric for classifying the plurality of groups selected in each selection process and generate an evaluation metric including the learned classification metrics.

11 Claims, 8 Drawing Sheets

CLASSIFYING TRAINING METHOD AND APPARATUS USING TRAINING SAMPLES SELECTED AT RANDOM AND CATEGORIES

CROSS-REFERENCE TO RELATED APPLICATIONS

This application is based upon and claims the benefit of priority from Japanese Patent Application No. 2010-192253, filed on Aug. 30, 2010; the entire contents of which are incorporated herein by reference.

FIELD

Embodiments described herein relate generally to a learning apparatus, a learning method, and a computer program product.

BACKGROUND

In recent years, as a classifier learning method, a method has been proposed in which the person gives an attribute corresponding to each learning sample to the learning sample in learning data in advance and a two-class classifier, which is a classification metric for classifying the given attribute, is learned. For example, when the learning sample is the image of the face of the person, the attribute given to the learning sample includes gender and the like.

In such learning method, various kinds of attributes are given to each learning sample in advance and the two-class classifier for each of the given attributes is learned. A plurality of learned two-class classifiers is used for recognizing an object by using the output value of each two-class classifier as the feature value of the object.

However, in the related art, the person needs to give the attribute to the learning sample, which results in an increase in cost.

DETAILED DESCRIPTION

According to an embodiment, a learning apparatus includes a learning sample storage unit configured to store therein a plurality of learning samples that are classified into a plurality of categories; a selecting unit configured to perform, plural times, a selection process of selecting a plurality of groups each including one or more learning samples from the learning sample storage unit; and a learning unit configured to learn a classification metric for classifying the plurality of groups selected in each selection process and generate an evaluation metric including the learned classification metrics.

Various embodiments will be described hereinafter with reference to the accompanying drawings.

First Embodiment

In a first embodiment, a learning apparatus that generates (learns) an evaluation metric used to recognize an object included in an image will be described.

Figure 1:
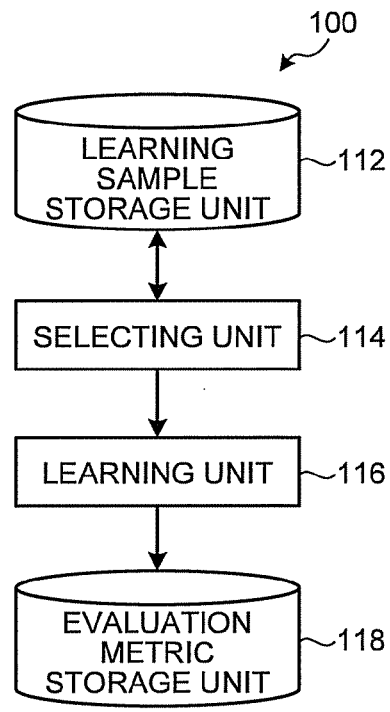
FIG. 1 is a block diagram illustrating an example of the structure of a learning apparatus according to a first embodiment.

FIG. 1 is a block diagram illustrating an example of the structure of a learning apparatus 100 according to the first embodiment. As shown in FIG. 1, the learning apparatus 100 includes a learning sample storage unit 112, a selecting unit 114, a learning unit 116, and an evaluation metric storage unit 118.

The learning sample storage unit 112 stores therein a plurality of learning samples that are classified into a plurality of categories. The category means the kind of learning sample. In the first embodiment, the learning sample is an image including an object, but the learning sample is not limited thereto. The learning sample storage unit 112 may be implemented by at least one of the existing storage devices that can magnetically, optically, or electrically store data, such as a Hard Disk Drive (HDD), a Solid State Drive (SSD), and a memory card.

In the first embodiment, the learning sample storage unit 112 stores therein M (M≥2) images. Here, C (C≥2) categories of images are prepared and the M images are classified into labeled with the C categories each having $M_h$ (1≤h≤C) images. That is, $M=M_1+\ldots+M_C$ is established. The category means the kind of object included in the image. For example, when the person is recognized using the image of the face of the person, the category is the kind of person. That is, when the images of three persons, that is, the image of the face of a person α, the image of the face of a person β, and the image of the face of a person γ, are included in M images, C is 3.

The selecting unit 114 performs a selection process of selecting a plurality of groups each including one or more learning samples from the learning sample storage unit 112 plural times. In particular, the selecting unit 114 selects a plurality of groups in such a manner that the numbers of categories of the learning samples or the numbers of samples included in the selected plurality of groups are substantially equal to each other. Specifically, the selecting unit 114 selects the plurality of groups in such a manner that the difference between the numbers of categories of the learning samples or the numbers of samples included in the selected plurality of groups is in a predetermined range. In the first embodiment, the selecting unit 114 selects the learning samples from the learning sample storage unit 112 at random (random sampling). In this way, it is expected that the categories of the learning samples included in the plurality of groups selected by the selecting unit 114 will be different in each selection process of the selecting unit 114. However, a method of selecting the learning samples is not limited thereto, but the learning samples may be selected on the basis of any selection standard as long as the categories of the learning samples included in a plurality of groups to be selected are different in each selection process.

In the first embodiment, the selecting unit 114 performs, N (N≥2) times, a selection process of selecting K (K≥2) groups at random from the learning sample storage unit 112 such that each group includes one or more images. In particular, during the selection process, the selecting unit 114 selects K groups at random such that the K groups have the same number of categories of images.

Therefore, the selecting unit 114 may perform weighting according to the number of categories of images such that the difference between the numbers of images in the K groups is reduced or such that a constant number of images are extracted regardless of the number of categories of images, without selecting all images from the learning sample storage unit 112 at random. When the number of images is constant, the selecting unit 114 may simply select the images from the category at random or may preferentially select the images which have not been selected as the learning samples from the category.

The learning unit 116 learns a classification metric selected in each selection process performed by the selecting unit 114, and generates an evaluation metric including the learned plurality of classification metrics. In the first embodiment, the learning unit 116 learns, for each set of the K groups selected by the selecting unit 114, a classifier $F_i(x)$ ($1 \le i \le N$) for classifying input data into one of the K groups and generates an evaluation metric $\{F_1(x), F_2(x), \ldots, F_N(x)\}$ including the learned N classifiers.

The evaluation metric $\{F_1(x), F_2(x), \ldots, F_N(x)\}$ generated by the learning unit 116 is used to recognize an object included in the image. Specifically, each of the N classifiers $F_i(x)$ included in the evaluation metric $\{F_1(x), F_2(x), \ldots, F_N(x)\}$ outputs an evaluation value for an image to be recognized. The evaluation value corresponds to, for example, likelihood or a class number indicating that the classifier belongs to which class, which is learned in advance. A plurality of output evaluation values is used as the feature value of the object included in the image. In this way, the evaluation value is used to recognize an object. A method of using the evaluation metric, such as the recognition of an object, will be described in detail in the following second embodiment.

The learning unit 116 can learn the classifier $F_i(x)$ for classifying the K groups using the existing learning method. For example, when learning a classifier for classifying two groups selected by the selecting unit 114, the learning unit 116 can use a learning method, such as a support vector machine method or a boosting method. For example, when learning a classifier for classifying three groups selected by the selecting unit 114, the learning unit 116 can use a learning method, such as a k-nearest neighbor classifier, Bayesian classification, or a neural network.

The evaluation metric storage unit 118 stores therein the evaluation metric generated by the learning unit 116. Specifically, the learning unit 116 stores the generated evaluation metric $\{F_1(x), F_2(x), \ldots, F_N(x)\}$ in the evaluation metric storage unit 118. The evaluation metric storage unit 118 may be implemented by at least one of the existing storage devices, similar to the learning sample storage unit 112.

Figure 2:
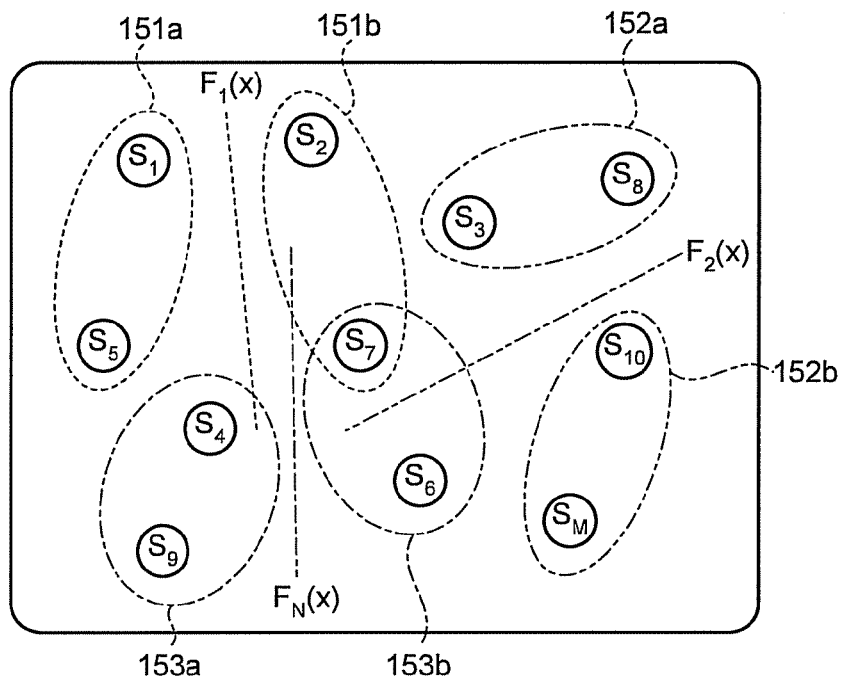
FIG. 2 is a diagram illustrating an example of an evaluation metric generating method according to the first embodiment.

FIG. 2 is a diagram illustrating an example of a method of generating the evaluation metric. In the example shown in FIG. 2, $S_1$ to $S_M$ (M≥11) indicate learning samples (images including objects) and C is M. That is, in the example shown in FIG. 2, the categories of all of the learning samples are different from one another. In the example shown in FIG. 2, K is 2. That is, in the example shown in FIG. 2, the selecting unit 114 selects two groups in such a manner that the number of categories of the learning samples included in each group is 2, that is, such that the number of learning samples included in each group is 2 since C is equal to M.

In the example shown in FIG. 2, the selecting unit 114 selects a group 151a including learning samples $S_1$ and $S_5$ and a group 151b including learning samples $S_2$ and $S_7$ in a first selection process. In addition, the selecting unit 114 selects a group 152a including learning samples $S_3$ and $S_8$ and a group 152b including learning samples $S_{10}$ and $S_M$ in a second selection process. The selecting unit 114 selects a group 153a including learning samples $S_4$ and $S_9$ and a group 153b including learning sample $S_6$ and $S_7$ in an N-th selection process.

The learning unit 116 learns the classifier $F_1(x)$ for classifying the group 151a and the group 151b selected in the first selection process of the selecting unit 114. In addition, the learning unit 116 learns the classifier $F_2(x)$ for classifying the group 152a and the group 152b selected in the second selection process of the selecting unit 114. The learning unit 116 learns the classifier $F_N(x)$ for classifying the group 153a and the group 153b selected in the N-th selection process of the selecting unit 114. In this way, the learning unit 116 generates the evaluation metric $\{F_1(x), F_2(x), \ldots, F_N(x)\}$ including the learned N classifiers.

Figure 3:
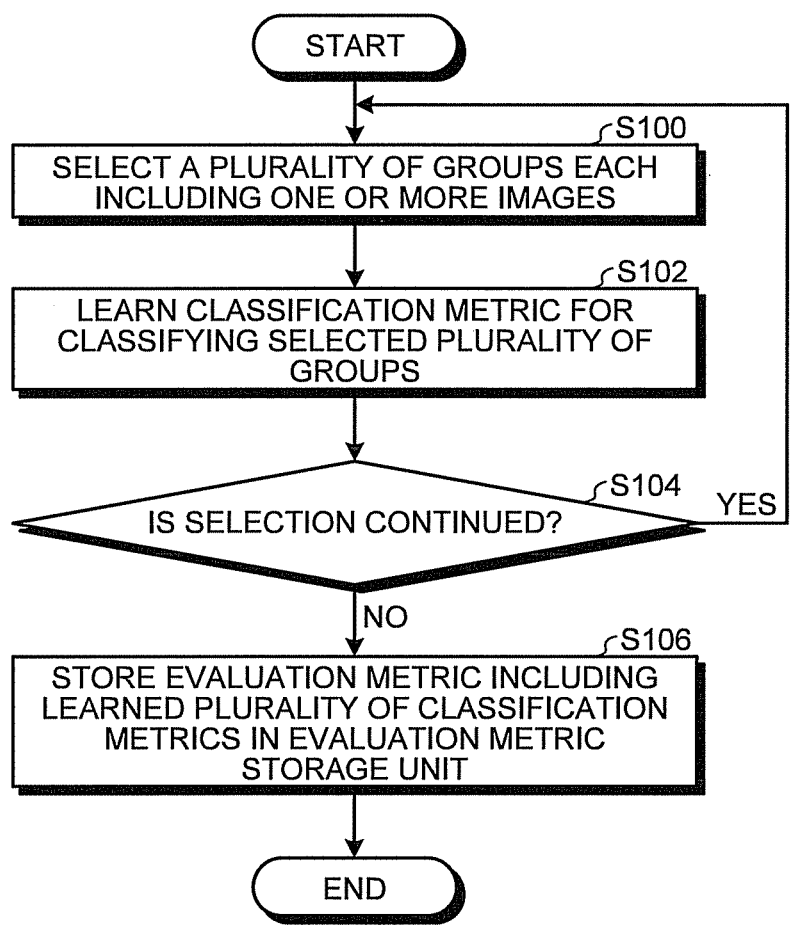
FIG. 3 is a flowchart illustrating an example of a learning process of the learning apparatus according to the first embodiment.

FIG. 3 is a flowchart illustrating an example of the procedure of a learning process of the learning apparatus 100 according to the first embodiment.

First, in Step S100, the selecting unit 114 selects a plurality of groups each including one or more images from the learning sample storage unit 112. In this case, the selecting unit 114 selects the plurality of groups in such a manner that the difference between the numbers of categories of images or the numbers of samples included in the selected plurality of groups is in a predetermined range.

Then, in Step S102, the learning unit 116 learns the classification metric for classifying the plurality of groups selected by the selecting unit 114.

Then, when the selection process is not performed N times, the selecting unit 114 determines to continue the select process (Yes in Step S104) and returns to Step S100. When the select process is performed N times, the selecting unit 114 determines not to continue the select process (No in Step S104) and proceeds to Step S106.

Then, in Step S106, the learning unit 116 generates the evaluation metric including the plurality of classification metrics learned in Step S102 and stores the evaluation metric in the evaluation metric storage unit 118.

As described above, the learning apparatus 100 according to the first embodiment learns the classification metric for classifying a plurality of groups selected in each selection process, that is, it learns the classification metric for classifying the categories of the learning samples or combinations of the categories in the groups. In the learning apparatus 100 according to the first embodiment, the selecting unit 114 automatically selects a plurality of groups, that is, the categories of the learning samples or combinations of the categories in each group. Therefore, according to the learning apparatus 100 of the first embodiment, the person does not need to give the classification metric, and it is possible to reduce the cost required to learning the classification metric. In contrast, in the method according to the related art, the person needs to give an attribute, such as the classification metric. As a result, the cost required to learn the classification metric increases.

In the learning apparatus 100 according to the first embodiment, the number of combinations of groups, that is, the number of categories of the learning samples or the number of combinations of the categories in the groups tends to be very large. Therefore, according to the learning apparatus 100 of the first embodiment, it is possible to learn the classification metrics a necessary number of times and generate the evaluation metric, without considering the upper limit. In contrast, in the method according to the related art, an attribute, such as the classification metric is limited to, for example, gender, race, or age that can be clearly determined by the person. Therefore, there is a limit in the number of classification metrics that can be learned.

In the learning apparatus 100 according to the first embodiment, the selecting unit 114 selects a plurality of groups at random in such a manner that the difference between the numbers of categories of the learning samples or the numbers of samples included in the plurality of groups is in a predetermined range. That is, in the learning apparatus 100 according to the first embodiment, the selecting unit selects a plurality of groups to be classified at random so as to have a uniform distribution. In the classification metrics thus learned so as to classify the selected groups, the evaluation value, which indicates that an image including an object to be recognized belongs to which group among the plurality of groups used for learning the classification, is determined at random.

Therefore, for example, when the same classification metric is used for two images including the same object, it is expected that the evaluation values will be the same. In other words, it is expected that two objects are classified into the same group among the plurality of groups. On the other hand, when different objects are included in two images, the evaluation values take no definite values, that is, the evaluation values are uncorrelated with each other. The decorrelation between the evaluation values for the two images including different objects means that the similarity between the evaluation values is zero when, for example, normalized correlation is used to calculate the similarity during the recognition of an object.

That is, since the learning apparatus 100 according to the first embodiment selects a plurality of groups at random such that the difference between the numbers of categories of the learning samples or the numbers of samples included in the plurality of selected groups is in a predetermined range, conversion for separating the similarity of different objects is incorporated into the classification metric for classifying the plurality of groups.

Therefore, according to the learning apparatus 100 of the first embodiment, it is possible to effectively recognize an object included in an image. That is, it is possible to effectively learn the evaluation metric including appropriate classification metrics from the learning samples in the recognition accuracy of an object. In contrast, in the method according to the related art, the learning sample is learned while leaning to one side according to an attribute (for example, one person or the other persons), which is the classification metric. Therefore, the distribution of the evaluation values of the classification metrics is not uniform and the evaluation metric that is effective to recognize an object included in an image may not be obtained.

Second Embodiment

In a second embodiment, an example of calculating the feature value of an image using the evaluation metric generated in the first embodiment will be described. The difference between the second embodiment and the first embodiment will be mainly described below. In the second embodiment, components having the same functions as those in the first embodiment are denoted by the same reference numerals as those in the first embodiment and a description thereof will not be repeated.

Figure 4:
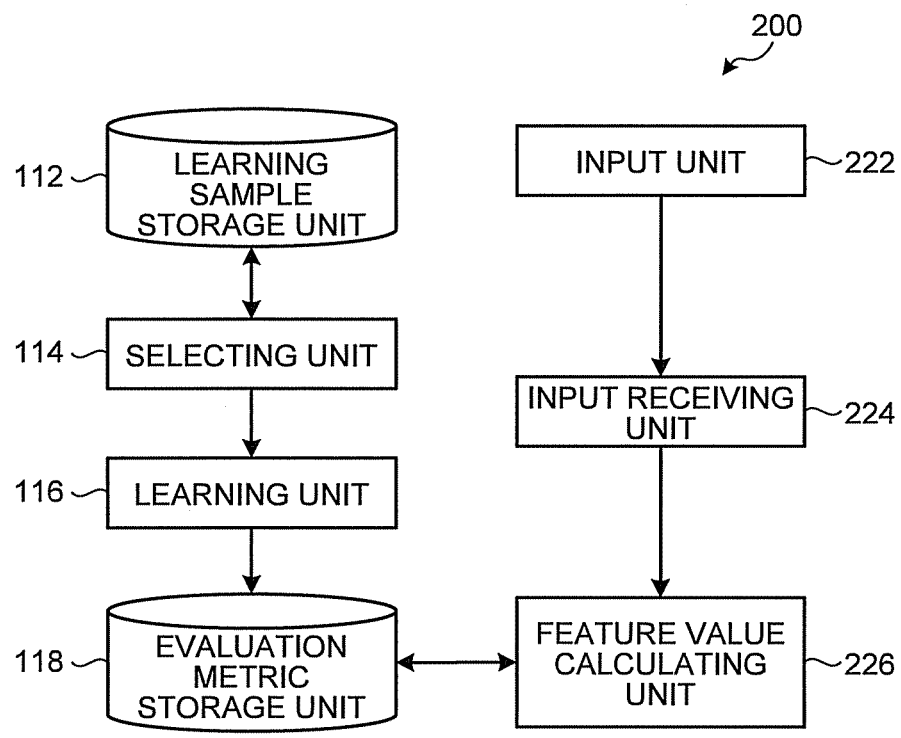
FIG. 4 is a block diagram illustrating an example of the structure of a learning apparatus according to a second embodiment.
Figure 5:
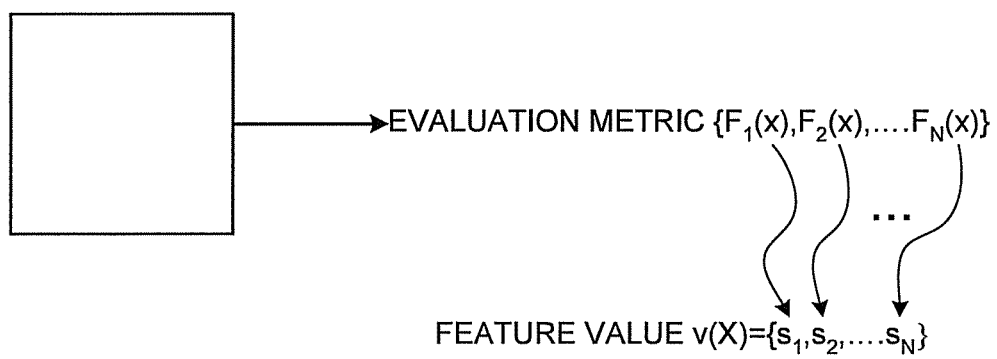
FIG. 5 is a diagram illustrating an example of an image feature value calculating method according to the second embodiment.

FIG. 4 is a block diagram illustrating an example of the structure of a learning apparatus 200 according to the second embodiment, and FIG. 5 is a diagram illustrating an example of a method of calculating the feature value of an image. As shown in FIG. 4, the learning apparatus 200 according to the second embodiment differs from the learning apparatus 100 according to the first embodiment in that it further includes an input unit 222, an input receiving unit 224, and a feature value calculating unit 226.

The input unit 222 inputs an image including an object to be recognized. For example, the input unit 222 inputs an image including the face of the person. The input unit 222 may input an image from which a portion that is not related to the face of the person, such as a background, is removed in advance by, for example, face detection.

In the second embodiment, an example in which the image input by the input unit 222 is data represented by a Ds-dimensional vector (Ds≥1) and each element of the vector is a luminance value will be described. For example, it is assumed that an image X input by the input unit 222 is represented by $(X_1, X_2, \ldots, X_{Ds})$, as shown in FIG. 5. However, the image input by the input unit 222 is not limited thereto.

The input unit 222 may be implemented by, for example, an imaging apparatus, such as a Universal Serial Bus (USB) camera or a digital camera, a recording device, such as a video tape or a Digital Versatile Disk (DVD), a reading apparatus, such as a scanner, or a communication apparatus, such as a network I/F.

The input receiving unit 224 receives the image including an object from the input unit 222.

The feature value calculating unit 226 calculates the feature value of the image received by the input receiving unit 224 using the evaluation metric stored in the evaluation metric storage unit 118. In this way, the unique feature value of the object included in the image is calculated and it is possible to recognize the object included in the image using the calculated feature value.

In the second embodiment, it is assumed that each of the classifiers $F_i(x)$ included in the evaluation metric $\{F_1(x), F_2(x), \ldots, F_N(x)\}$ stored in the evaluation metric storage unit 118 returns an evaluation value $s_i$ for the image X, as represented by Expression (1). Even when the learning unit 116 learns the classifiers $F_i(x)$ using any learning method, the output of the classifier $F_i(x)$ is represented as, for example, likelihood belonging to a group to be classified and satisfies the following Expression (1).

$$F_i(X) = s_i \tag{1}$$

In the second embodiment, an example in which the evaluation value $s_i$ is a scalar will be described, but the embodiment is not limited thereto. For example, the evaluation value $s_i$ may be a vector having a plurality of elements. The following description may be similarly applied to an example in which the evaluation value $s_i$ is a vector. For example, when the learning unit 116 learns the classifiers $F_i(x)$ using a learning method in which three or more groups are classified, the output of the classifiers $F_i(x)$ is a vector having likelihood belonging to each category included in the groups to be classified as an element.

Specifically, as shown in FIG. 5, the feature value calculating unit 226 applies the image X received by the input receiving unit 224 to the evaluation metric $\{F_1(x), F_2(x), \ldots, F_N(x)\}$ stored in the evaluation metric storage unit 118 to acquire the evaluation value $s_i$, and calculates the feature value v(X) of the image X from the acquired evaluation value $s_i$. In the second embodiment, the feature value calculating unit 226 lines up all evaluation values $s_i$ into one to calculate the feature value v(X) of the image X, as shown in FIG. 5 and Expression (2).

$$v(X) = (s_1, s_2, \ldots, s_N) \quad (2)$$

For example, it is assumed that when the classifiers $F_i(x)$ classify two classes, the feature value v(X) is a function that outputs 0 or 1 as the evaluation value $s_i$. In this case, the feature value calculating unit 226 calculates the feature value of the image X received by the input receiving unit 224 as a vector represented by a combination of 0 and 1, such as v(X)=(1, 1, 0, 1, 0, ..., 1). In addition, the feature value calculating unit 226 calculates the feature value of an image Y(Y≠X) received by the input receiving unit 224 as a vector represented by a combination of 0 and 1, such as v(Y)=(0, 1, 1, 1, 0, ..., 0). The calculated feature value of the image Y is different from that of the image X. That is, in this example, the vector represented by a combination of 0 and 1 is the unique feature value of the object included in the image. This is the same as that when the classifiers $F_i(x)$ classify two or more classes and the feature value v(X) is a function that outputs a real number other than 0 and 1 as the evaluation value $s_i$.

However, a method of calculating the feature value is not limited to the above, but the feature value may be calculated using the acquired evaluation values $s_i$ in any way.

When the evaluation value $s_i$ is a vector, the feature value v(X) of the image X is an array of the elements of the evaluation value $s_i$. That is, when the dimension number of the evaluation value $s_i$ is $d_i$, the dimension number D of the feature value v(X) of the image X is the total sum of the dimension numbers $d_i$ (D=$d_1$+ ... +$d_N$). The dimension numbers $d_i$ of the evaluation values $s_i$ may be equal to or different from each other.

The feature value calculating unit 226 may calculate the feature value v(x) as the histogram of the evaluation value $s_i$. Specifically, the feature value calculating unit 226 may discretize the evaluation value $s_i$ (for each element, if needed) and vote bins corresponding to the resultant values to calculate a histogram feature value v(x).

When the evaluation value $s_i$ is a vector, the feature value calculating unit 226 may calculate the histogram feature value v(x) as the histogram of the dimension number $d_i$. When the evaluation values $s_i$ with different dimension numbers, such as a scalar and a vector, are mixed, the feature value calculating unit 226 may calculate the histogram feature value for the same kind of evaluation value $s_i$ and arrange the calculated histogram feature value as one vector to calculate the histogram feature value v(x).

The feature value calculating unit 226 may further arrange (connect), as one vector, the feature value obtained by lining up the evaluation values $s_i$ as one vector and the histogram feature value obtained by arranging the evaluation values $s_i$ as a histogram, thereby calculating the feature value v(x). The feature value calculating unit 226 may perform non-linear conversion on the evaluation value $s_i$ to calculate the feature value. The feature value calculating unit 226 may normalize the calculated feature value. For example, the feature value calculating unit 226 may set the average of the calculated feature value to zero or set the mean square of the feature value to one.

Figure 6:
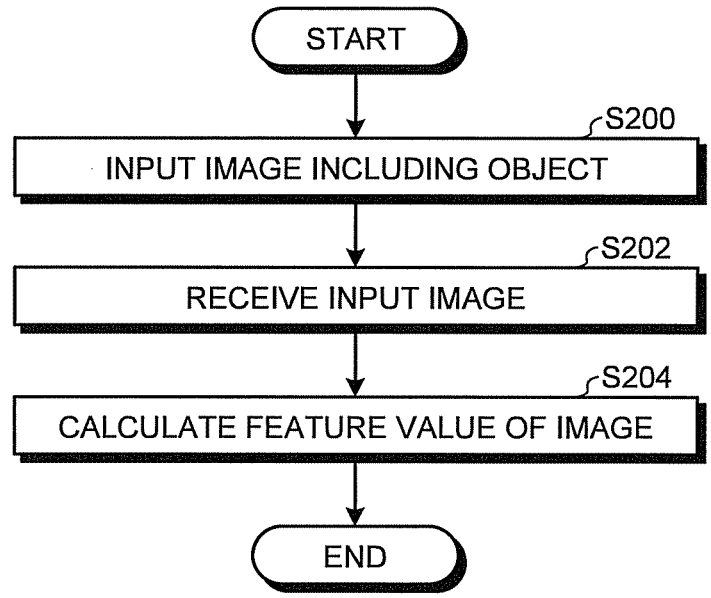
FIG. 6 is a flowchart illustrating an example of a feature value calculating process of the learning apparatus according to the second embodiment.

FIG. 6 is a flowchart illustrating an example of the procedure of a feature value calculating process of the learning apparatus 200 according to the second embodiment.

First, in Step S200, the input unit 222 inputs an image including an object to be recognized.

Then, in Step S202, the input receiving unit 224 receives the image including the object from the input unit 222.

Then, in Step S204, the feature value calculating unit 226 calculates the feature value of the image received by the input receiving unit 224 using the evaluation metric stored in the evaluation metric storage unit 118 and outputs the feature value.

As described above, the learning apparatus 200 according to the second embodiment can calculate the feature value that appropriately indicates the feature of an object to be recognized, using the evaluation metric generated in the first embodiment.

Third Embodiment

In a third embodiment, an example of extracting the feature of an input image and calculating the feature value of the extracted image feature will be described. The difference between the third embodiment and the second embodiment will be mainly described below. In the third embodiment, components having the same functions as those in the second embodiment are denoted by the same reference numerals as those in the second embodiment and a description thereof will not be repeated.

Figure 7:
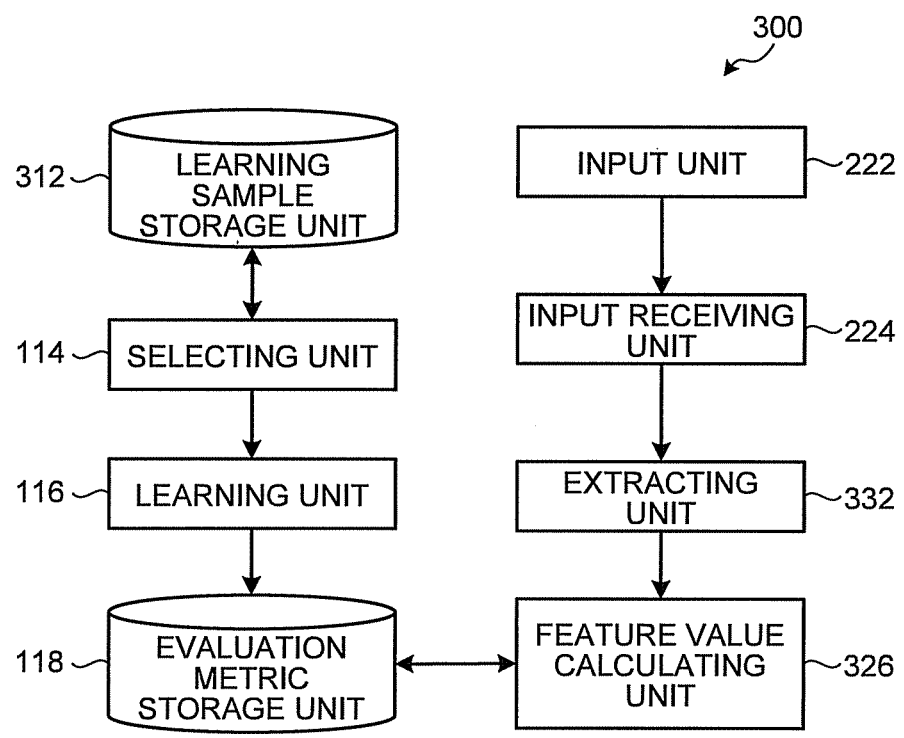
FIG. 7 is a block diagram illustrating an example of the structure of a learning apparatus according to a third embodiment.

FIG. 7 is a block diagram illustrating an example of the structure of a learning apparatus 300 according to the third embodiment. As shown in FIG. 7, the learning apparatus 300 according to the third embodiment differs from the learning apparatus 200 according to the second embodiment in the structure of a learning sample storage unit 312 and a feature value calculating unit 326 and in that it further includes an extracting unit 332.

The learning sample storage unit 312 stores therein the features of images including objects as the learning samples. That is, in the third embodiment, the learning sample storage unit 112 stores therein the features of M images. The image feature corresponds to, for example, an edge feature, a color histogram, or the histogram of oriented gradients of the luminance differences between pixels. In this case, the classifiers learned by the learning unit 116 and the evaluation metric including the learned classifiers are an evaluation metric suitable for the image features. That is, in the third embodiment, the evaluation metric stored in the evaluation metric storage unit 118 is suitable to calculate the feature values of the image features.

The extracting unit 332 extracts the feature of the image received by the input receiving unit 224. The extracting unit 332 extracts an image feature corresponding to the image feature stored in the learning sample storage unit 312 from the image received by the input receiving unit 224. For example, when the image feature stored in the learning sample storage unit 312 is an edge feature, the extracting unit 332 extracts the edge feature as the image feature from the image received by the input receiving unit 224.

The feature value calculating unit 326 calculates the feature value of the image feature extracted by the extracting unit 332 using the evaluation metric stored in the evaluation metric storage unit 118.

Figure 8:
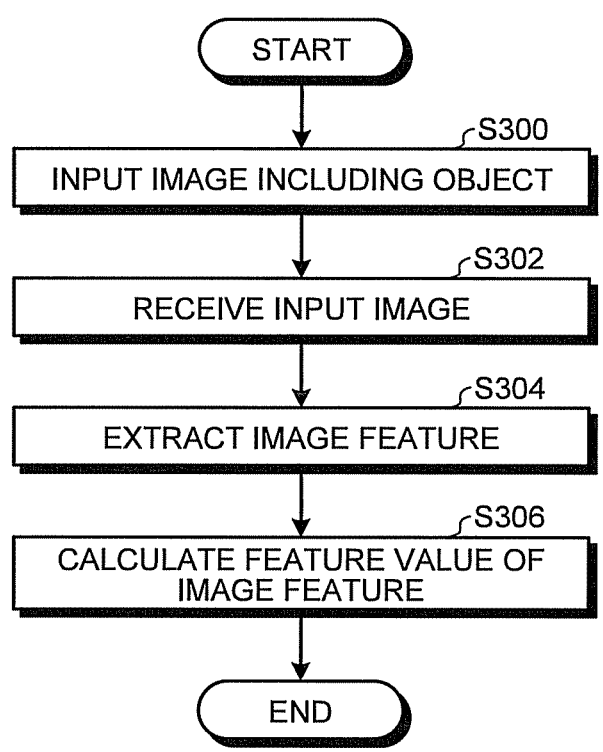
FIG. 8 is a flowchart illustrating an example of a feature value calculating process of the learning apparatus according to the third embodiment.

FIG. 8 is a flowchart illustrating an example of the procedure of a feature value calculating process of the learning apparatus 300 according to the third embodiment.

First, Steps S300 to S302 are the same as Steps S200 to S202 in the flowchart shown in FIG. 6.

In Step S304, the extracting unit 332 extracts the feature of the image received by the input receiving unit 224.

Then, in Step S306, the feature value calculating unit 326 calculates the feature value of the image feature extracted by the extracting unit 332 using the evaluation metric stored in the evaluation metric storage unit 118.

As described above, the learning apparatus 300 according to the third embodiment extracts a feature from an input image and applies the extracted image feature to the evaluation metric to calculate the feature value. The feature value calculated by the learning apparatus 300 according to the third embodiment is used to recognize an object. Therefore, it is possible to accurately recognize a variation in the luminance of an input image or a variation in the imaging conditions of an object.

In the learning apparatus 300 according to the third embodiment, the extracted image feature is applied to the evaluation metric to calculate the feature value. Therefore, when the dimension number of the feature value is smaller than the dimension number of the image feature, the feature value is less than that when the feature value is directly calculated from the image features, and it is possible to more effectively represent an object.

Fourth Embodiment

In a fourth embodiment, an example of calculating the similarity of the feature value will be described. The difference between the fourth embodiment and the third embodiment will be mainly described below. In the fourth embodiment, components having the same functions as those in the third embodiment are denoted by the same reference numerals as those in the third embodiment and a description thereof will not be repeated.

Figure 9:
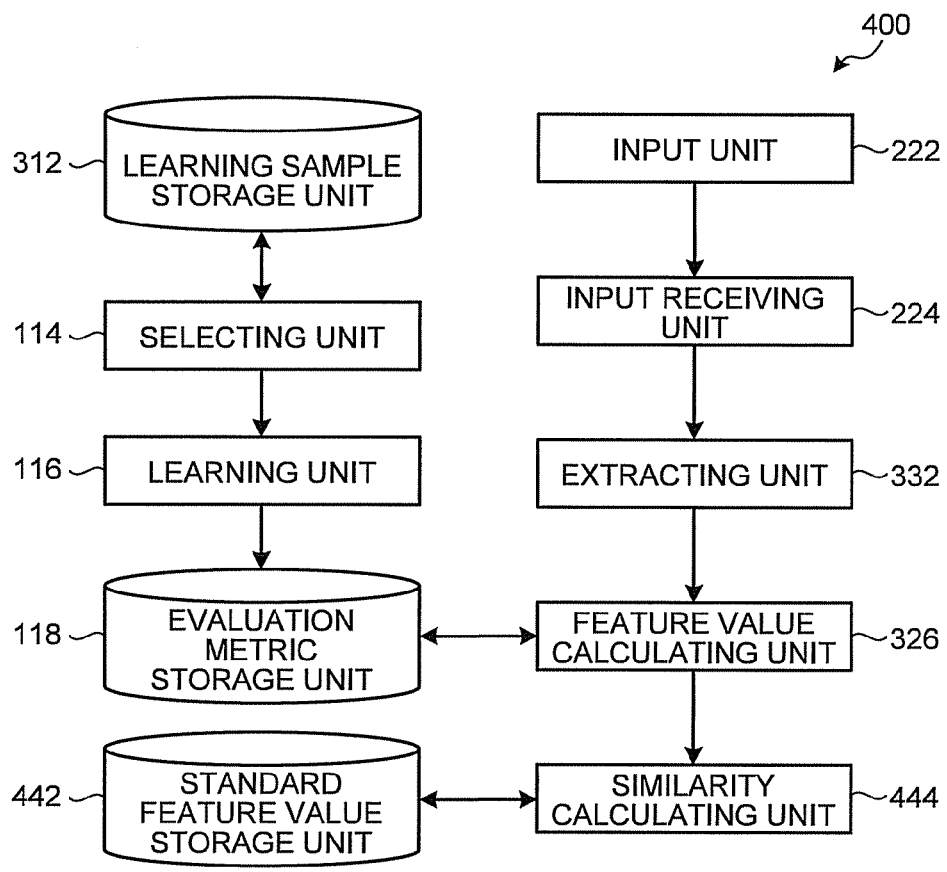
FIG. 9 is a block diagram illustrating an example of the structure of a learning apparatus according to a fourth embodiment.
Figure 10:
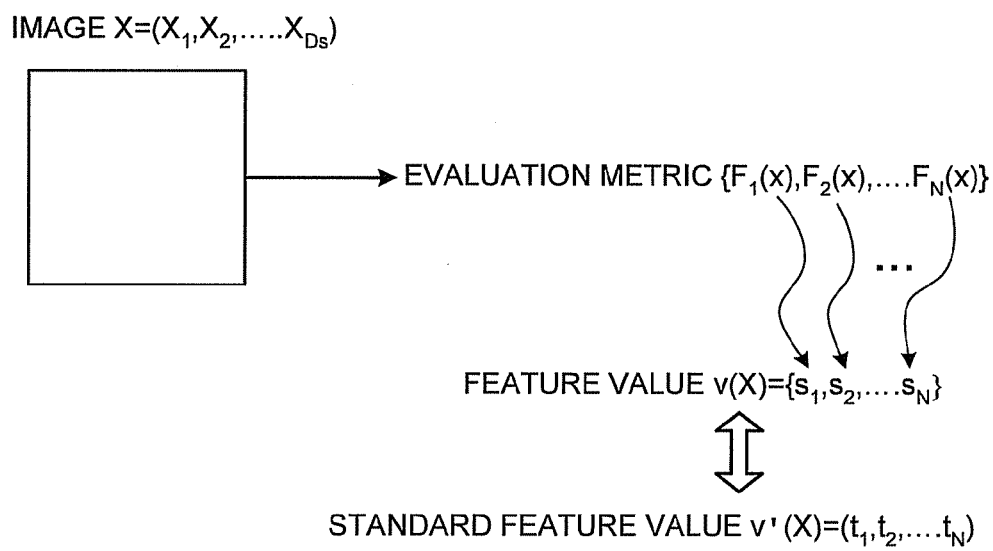
FIG. 10 is a diagram illustrating an example of a similarity calculating method according to the fourth embodiment.

FIG. 9 is a block diagram illustrating an example of the structure of a learning apparatus 400 according to the fourth embodiment, and FIG. 10 is a diagram illustrating an example of a method of calculating the similarity of the feature value. As shown in FIG. 9, the learning apparatus 400 according to the fourth embodiment differs from the learning apparatus 300 according to the third embodiment in that it further includes a standard feature value storage unit 442 and a similarity calculating unit 444.

The standard feature value storage unit 442 stores therein a standard feature value which is a standard for recognizing an object. The standard feature value storage unit 442 stores therein, for example, a standard feature value v'(X), which is a standard for recognizing an object in an image X, as shown in FIG. 10 and Expression (3). The standard feature value storage unit 442 may be implemented by at least one of the existing storage devices, similar to the learning sample storage unit 112.

$$v'(X)=(t_1, t_2, \ldots, t_N) \qquad (3)$$

The similarity calculating unit 444 calculates the similarity between the feature value calculated by the feature value calculating unit 326 and the standard feature value stored in the standard feature value storage unit 442. For example, the similarity calculating unit 444 calculates the normalized correction between the feature value v(X) calculated by the feature value calculating unit 326 and the standard feature value v'(X) stored in the standard feature value storage unit 442, or Euclidean distance or Mahalanobis distance between vectors, thereby calculating the similarity. However, a method of calculating the similarity is not limited thereto.

Figure 11:
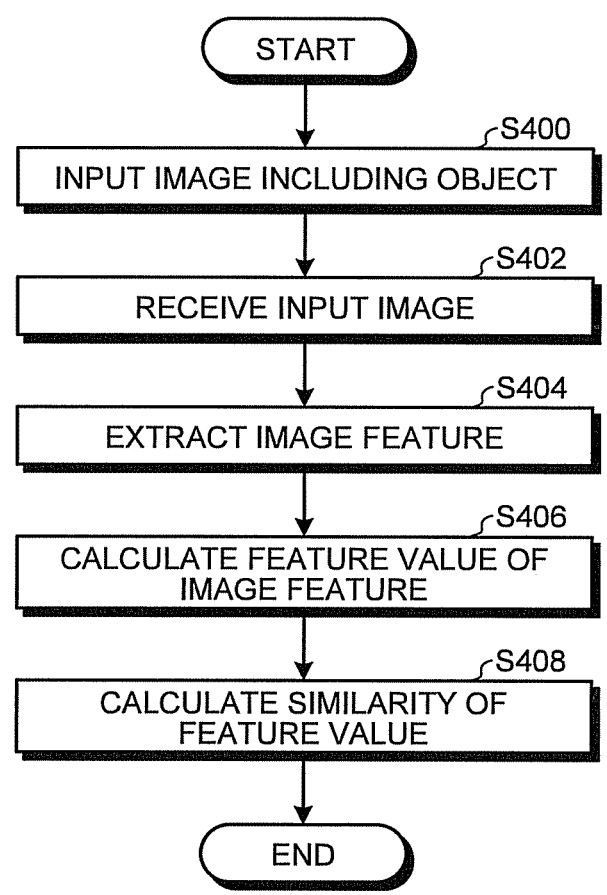
FIG. 11 is a flowchart illustrating an example of a similarity calculating process of the learning apparatus according to the fourth embodiment.

FIG. 11 is a flowchart illustrating an example of the procedure of a similarity calculating process of the learning apparatus 400 according to the fourth embodiment.

First, Steps S400 to S406 are the same as Steps S300 to S306 in the flowchart shown in FIG. 8.

Then, in Step S408, the similarity calculating unit 444 calculates the similarity between the feature value calculated by the feature value calculating unit 326 and the standard feature value stored in the standard feature value storage unit 442 and outputs the similarity.

As described above, the learning apparatus 400 according to the fourth embodiment extracts a feature of an input image, applies the extracted image feature to the evaluation metric to calculate a feature value, and calculates the similarity between the calculated feature value and the standard feature value. Therefore, it is possible to recognize an appropriate object with high accuracy.

In particular, in the learning apparatus 400 according to the fourth embodiment, the similarity is not calculated from the extracted image feature, but the similarity between the feature value calculated by applying the extracted image feature to the evaluation metric and the standard feature value is calculated. When the similarity is calculated from the image feature, the similarity increases due to a spherical concentration phenomenon as the dimension number of the image feature increases, which makes it difficult to appropriately measure the similarity. In contrast, in the learning apparatus 400 according to the fourth embodiment, in the calculation of the similarity, a high-dimensional image feature is converted into a low-dimensional feature value using the evaluation metric and then the similarity is calculated. Therefore, it is possible to calculate the similarity using an arbitrary image feature, regardless of the dimension number of the image feature.

In addition, since the learning apparatus 400 according to the fourth embodiment applies the extracted image feature to the evaluation metric to calculate the feature value, the dimension number of the feature value, that is, the size of a memory required to store the feature value is reduced and the standard feature value is also reduced. Therefore, according to the learning apparatus 400 of the fourth embodiment, it is possible to reduce the storage capacity of the standard feature value storage unit 442 required to store the feature value. In general, since the dimension number of the feature value is proportional to the processing time required to calculate the similarity, it is possible to increase the similarity calculation speed of the similarity calculating unit 444.

Modification 1

In each of the above-described embodiments, the learning unit 116 may switch plural kinds of learning methods to calculate the classification metrics. For example, the learning unit 116 may switch plural kinds of existing learning methods, such as the support vector machine method and the boosting method, to learn the classifiers.

The learning unit 116 may switch the classifier learning methods according to the classifiers to be learned. For example, when the selecting unit 114 performs an l-th ($1 \leq l \leq N$) selection process, the selecting unit 114 may select two groups and the learning unit 116 may learn the classifiers using the support vector machine. When the selecting unit 114 performs an m-th ($1 \leq m \leq N$) selection process, the selecting unit 114 may select three groups and the learning unit 116 may learn the classifiers using the k-nearest neighbor classifier.

As such, when the learning method is appropriately changed depending on the number of selected groups or the learning sample, it is possible to appropriately learn the classification metrics and generate the evaluation metric. In this way, it is possible to effectively calculate the feature value of an input image or image features with high accuracy.

Modification 2

In each of the above-described embodiments, the feature value of the learning sample may be calculated using the evaluation metric generated by the learning unit and the calculated feature value may be stored as the learning sample in the learning sample storage unit. That is, the feature value of the learning sample that is calculated using the evaluation metric generated by the learning of the learning sample may be used for the learning sample, thereby recursively learning the evaluation metric. The difference between Modification 2 and the first embodiment will be mainly described below. In Modification 2, components having the same functions as those in the first embodiment are denoted by the same reference numerals as those in the first embodiment and a description thereof will not be repeated.

Figure 12:
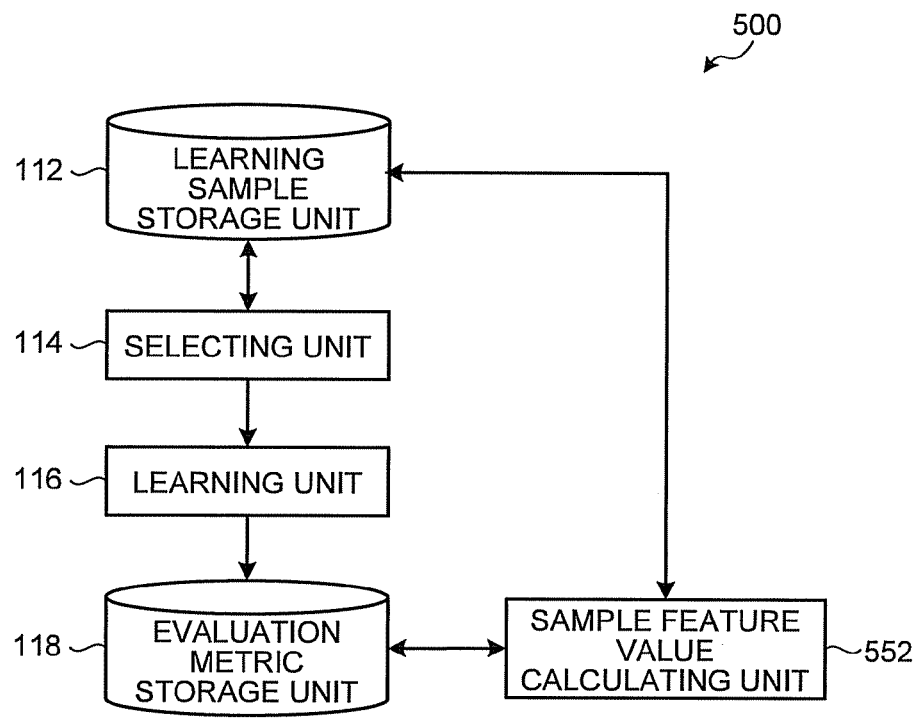
FIG. 12 is a block diagram illustrating an example of the structure of a learning apparatus according to Modification 2.

FIG. 12 is a block diagram illustrating an example of the structure of a learning apparatus 500 according to Modification 2. As shown in FIG. 12, the learning apparatus 500 according to Modification 2 differs from the learning apparatus 100 according to the first embodiment in that it further includes a sample feature value calculating unit 552.

The sample feature value calculating unit 552 calculates the feature value of the learning sample (image) using the evaluation metric generated by the learning unit 116 and stores the calculated feature value as a learning sample in the learning sample storage unit 112. In this way, the feature value of the learning sample that is calculated using the evaluation metric generated by the learning of the learning sample is used as a learning sample again and the evaluation metric is recursively learned. The feature value calculating method of the sample feature value calculating unit 552 is the same as that of the feature value calculating unit. In Modification 2, the learning sample whose feature value will be calculated is stored in the learning sample storage unit 112, but the embodiment is not limited thereto. Learning samples other than the learning samples stored in the learning sample storage unit 112 may be prepared and used.

The learning unit 116 may generate the evaluation metric under various conditions, such as the image stored in the learning sample storage unit 112, the kind of feature or parameters of the image stored in the learning sample storage unit 112, and the kind of learning method. The sample feature value calculating unit 552 may calculate the feature value using the evaluation metric and store the calculated feature value as a learning sample in the learning sample storage unit 112. Specifically, the sample feature value calculating unit 552 stores a new feature value obtained by connecting a plurality of calculated feature values into one vector as a learning sample in the learning sample storage unit 112.

According to Modification 2, it is possible to recursively learn the evaluation metric. In particular, according to Modification 2, a plurality of calculated feature values is integrated into a new feature value and the integrated new feature value is used as a learning sample for learning the evaluation metric. In this way, it is possible to learn the evaluation metric from a new feature value. When a plurality of different feature values is integrated, the problem is how to integrate a plurality of feature values with different statistical properties, such as output ranges or averages. In contrast, according to Modification 2, when learning the classification metrics, the classifiers automatically absorb the difference between the statistical properties of a plurality of feature values before the feature values are integrated into a new feature value from the learning samples. Therefore, it is possible to integrate the feature values without considering an integration method. In this way, it is possible to generate the evaluation metric with high accuracy of recognition.

Modification 3

In the third and fourth embodiments, the learning sample storage unit 312 may store plural kinds of image features as the learning samples for each image. In this case, the selecting unit 114 selects the kind of image feature to be used as well as the image feature, and the extracting unit 332 extracts a plurality of image features from the image. The selecting unit 114 may use any selection method. For example, the selecting unit 114 may select the kind of image feature at random or preferentially select the image feature that has not been selected.

Modification 4

In the above-described embodiments and modifications, the evaluation metric used to recognize an object included in an image is generated (learned) and the learning sample is an image or an image feature. However, the invention is not limited thereto. For example, the invention can be applied to various kinds of fields, such as voice recognition. For example, when the invention is applied to voice recognition, a voice signal may be used as the learning sample. In this case, a voice signal to be recognized may be represented by a $D_s$-dimensional vector, and an element of the vector may be the value of the voice signal. As such, when a learning sample corresponding to a recognition target is prepared, data of the recognition target is represented by a $D_s$-dimensional vector, and the element of the vector is a value corresponding to the recognition target, the invention can be easily applied to any field.

Figure 13:
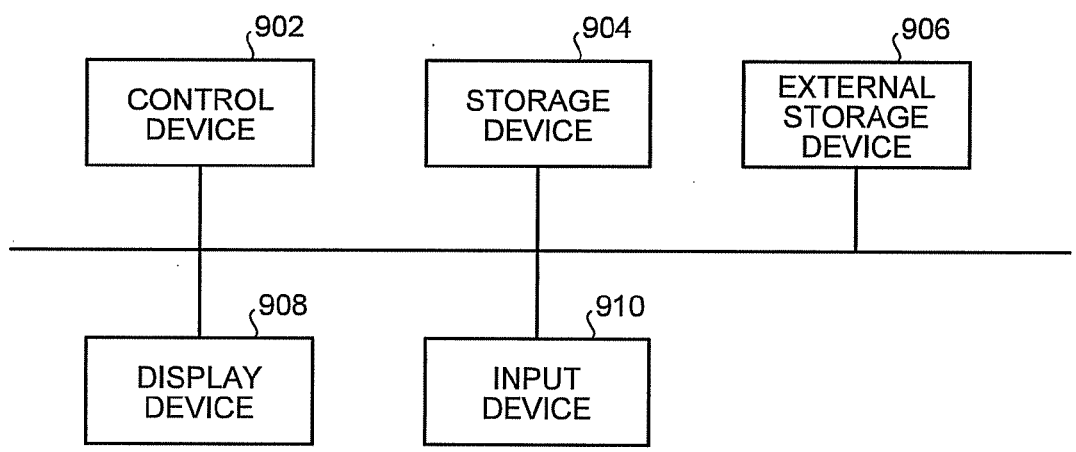
FIG. 13 is a block diagram illustrating an example of the hardware structure of the learning apparatus according to each of the embodiments and modifications.

FIG. 13 is a block diagram illustrating an example of the hardware structure of the learning apparatus according to each of the above-described embodiments and modifications. As shown in FIG. 13, the learning apparatus according to each of the above-described embodiments and modifications includes a control device 902, such as a Central Processing Unit (CPU), a storage device 904, such as a ROM or a RAM, an external storage device 906, such as an HDD or an SSD, a display device 908, such as a display, an imaging device, a recording device, a reading device, a network I/F, and an input device 910, such as a keyboard or a mouse. The learning apparatus has a hardware structure using a general computer.

A learning program executed by the learning apparatus according to each of the above-described embodiments and modifications is stored as a file of an installable format or an executable format in a computer-readable storage medium, such as a CD-ROM, a CD-R, a memory card, a DVD, or a flexible disk (FD), and is then provided.

The learning program executed by the learning apparatus according to each of the above-described embodiments and modifications may be stored in a computer that is connected to a network, such as the Internet, downloaded from the computer through the network, and then provided. In addition, the learning program executed by the learning apparatus according to each of the above-described embodiments and modifications may be provided or distributed through a network such as the Internet. The learning program executed by the learning apparatus according to each of the above-described embodiments and modifications may be incorporated into, for example, a ROM in advance and then provided.

The learning program executed by the learning apparatus according to each of the above-described embodiments and modifications has a module structure for implementing the functions of each of the above-mentioned units on the computer. As actual hardware, the CPU reads the learning program from, for example, the HDD to the RAM and executes the learning program to implement the function of each unit on the computer.

As described above, according to each of the above-described embodiments and modifications, it is possible to reduce the cost required to learn the classification metric.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A training apparatus comprising:
a training sample storage unit that stores therein a plurality of training samples that are classified into C (C≥3) categories, wherein categories of the plurality of categories are different from each other;
a selecting unit that performs, N (N≥2) times, a selection process of selecting a plurality of groups each including one or more training samples from the training sample storage unit, the one or more training samples included in each of the plurality of groups being selected at random; and
a training unit that trains, each time the selection process is performed, a classifier Fi(x) for classifying the plurality of groups selected in the selection process, where 1≤i≤N, and generates an evaluation metric, wherein
the evaluation metric is an array of classifiers F1(x), F2(x), through FN(x),
the evaluation metric outputs a feature value v(X) for an input data,
the feature value v(X) is an array of elements of an evaluation si,
the evaluation value si is an output of the classifier $F_i(x)$ for the input data,
the evaluation si is a vector, and
the feature value v(X) indicates to which category the input data belongs among the C categories and one or more non-C categories.

2. The apparatus according to claim 1,
wherein the selecting unit selects the plurality of groups at random in such a manner that a difference between the numbers of categories of the training samples or the numbers of samples in the selected plurality of groups is in a predetermined range.

3. The apparatus according to claim 1, wherein
the training sample and the input data are each an image, and
the apparatus further comprises:
an input receiving unit that receives the image including an object; and
a feature value calculating unit that calculates the feature value v(X) of the image using the evaluation metric.

4. The apparatus according to claim 3, wherein
the training sample and the input data are each an image feature,
the apparatus further comprises an extracting unit that extracts a feature of the image, and
the feature value calculating unit calculates the feature value v(X) of the image feature using the evaluation metric.

5. The apparatus according to claim 3, further comprising a similarity calculating unit that calculates a similarity between the feature value v(X) and a standard feature value of the object.

6. The apparatus according to claim 1, wherein the training unit switches between plural kinds of training methods to train the classifier Fi(x) based on a number of groups selected by the selecting unit.

7. The apparatus according to claim 1, further comprising a sample feature value calculating unit that calculates a feature value of the training sample using the evaluation metric and stores the calculated feature value as a training sample in the training sample storage unit.

8. The apparatus according to claim 4, wherein the training sample storage unit stores therein plural kinds of image features as the training samples.

9. The apparatus according to claim 5, wherein the training sample storage unit stores therein plural kinds of image features as the training samples.

10. A learning method comprising:
performing, N (N≥2) times, a selection process of selecting a plurality of groups each including one or more training samples from a training sample storage unit that stores therein a plurality of training samples that are classified into C (C≥3) categories, each of the C categories being different, the one or more training samples included in each of the plurality of groups being selected at random;
training, each time the selection process is performed, a classifier $F_i(x)$ for classifying the plurality of groups selected in the selection process, where 1≤i≤N; and
generating an evaluation metric,
wherein
the evaluation metric is an array of classifiers F1(x), F2(x), through FN(x),
the evaluation metric outputs a feature value v(X) for an input data,
the feature value v(X) is an array of elements of an evaluation value si,
the evaluation value si is an output of the classifier Fi(x) for the input data,
the evaluation value si is a vector, and
the feature value v(x) indicates to which category the input data belongs among the C categories and one or more non-C categories.

11. A computer program product comprising a non-transitory computer-readable medium having programmed instructions, wherein the instructions, when executed by a computer, cause the computer to perform:
performing, N (N≥2) times, a selection process of selecting a plurality of groups each including one or more training samples from a training sample storage unit that stores therein a plurality of training samples that are classified into a C (C≥3) categories, each of the C categories being different, the one or more training samples included in each of the plurality of groups being selected at random;

training, each time the selected process is performed, a classifier Fi(x) for classifying the plurality of groups selected in the selection process, where $1 \leq i \leq N$; and generating an evaluation metric, wherein the evaluation metric is an array of classifiers F1(x), F2(x), through FN(x), the evaluation metric outputs a feature value v(X) for an input data, the feature value v(X) is an array of elements of an evaluation value si, the evaluation value si is an output of the classifier Fi(x) for the input data, the evaluation value si is a vector, and the feature value v(x) indicates to which category the input data belongs among the C categories and one or more non-C categories.

\* \* \* \* \*